(12) United States Patent
Tamura et al.

(10) Patent No.: US 10,377,224 B2
(45) Date of Patent: Aug. 13, 2019

(54) COUPLING STRUCTURE OF IN-WHEEL MOTOR DRIVE DEVICE AND STRUT TYPE SUSPENSION DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/762,573

(22) PCT Filed: Sep. 16, 2016

(86) PCT No.: PCT/JP2016/077479
§ 371 (c)(1),
(2) Date: Mar. 23, 2018

(87) PCT Pub. No.: WO2017/057066
PCT Pub. Date: Apr. 6, 2017

(65) Prior Publication Data
US 2018/0264929 A1 Sep. 20, 2018

(30) Foreign Application Priority Data
Sep. 28, 2015 (JP) .................................. 2015-190164

(51) Int. Cl.
*B60K 7/00* (2006.01)
*B60G 3/28* (2006.01)
(Continued)

(52) U.S. Cl.
CPC ............ *B60K 7/0007* (2013.01); *B60B 35/14* (2013.01); *B60G 3/28* (2013.01); *B60K 7/00* (2013.01);
(Continued)

(58) Field of Classification Search
CPC .. B60K 7/007; B60K 7/00; B60K 2007/0061; B60K 17/043; B60K 2007/0038; B60G 2200/142
See application file for complete search history.

(56) References Cited

U.S. PATENT DOCUMENTS 5,087,229 A * 2/1992 Hewko ................ B60K 7/0007
180/65.51
7,306,065 B2 * 12/2007 Nagaya .................... B60G 3/20
180/65.51

(Continued)

FOREIGN PATENT DOCUMENTS

JP    2001-315534    11/2001
JP    2004-090822    3/2004

(Continued)

*Primary Examiner* — Brian L Swenson
(74) *Attorney, Agent, or Firm* — Clark & Brody

(57) ABSTRACT

A strut type suspension device has a retractable strut (111) that connects to an upper portion of an in-wheel motor drive device (10) so as not to relatively move; and a swingable lower arm (116) that is coupled to a lower portion of the in-wheel motor drive device in any direction, and permits vertical swinging of the in-wheel motor drive device and also permits steering of the in-wheel motor drive device about a steering shaft (S) that passes through a coupling point (119) between the lower arm (116) and the in-wheel motor drive device. An axis (M) of the motor portion (21) of the in-wheel motor drive device is arranged above a height of the coupling point (119) of the lower arm (116).

14 Claims, 7 Drawing Sheets

(51) Int. Cl.
  *B62D 7/18* (2006.01)
  *B60B 35/14* (2006.01)
  *B60K 17/04* (2006.01)
  *B62D 7/20* (2006.01)
  *B60B 27/00* (2006.01)
  *B60B 27/02* (2006.01)

(52) U.S. Cl.
  CPC ............. *B60K 17/043* (2013.01); *B62D 7/18* (2013.01); *B62D 7/20* (2013.01); *B60B 27/0005* (2013.01); *B60B 27/0026* (2013.01); *B60B 27/0052* (2013.01); *B60B 27/02* (2013.01); *B60B 2900/112* (2013.01); *B60B 2900/114* (2013.01); *B60B 2900/115* (2013.01); *B60G 2200/142* (2013.01); *B60G 2204/148* (2013.01); *B60K 2007/0038* (2013.01); *B60K 2007/0061* (2013.01)

(56) References Cited

U.S. PATENT DOCUMENTS

| | | | | |
|---|---|---|---|---|
| 7,350,605 B2* | 4/2008 | Mizutani | .............. | B60K 7/0007 180/65.1 |
| 7,703,565 B2* | 4/2010 | Ikenoya | .................... | B60G 3/20 180/65.51 |
| 7,703,780 B2* | 4/2010 | Mizutani | .................. | B60G 3/20 280/124.1 |
| 8,342,612 B2* | 1/2013 | Sgherri | ................ | B60K 7/0007 180/65.51 |
| 8,453,774 B2* | 6/2013 | Nagaya | .................... | B60G 3/01 180/65.51 |
| 9,145,050 B2* | 9/2015 | Kawasaki | ............ | B60K 7/0007 180/65.51 |
| 2005/0056471 A1* | 3/2005 | Kurata | .................... | B60G 3/01 180/65.51 |
| 2009/0133944 A1* | 5/2009 | Nishioka | .................... | B60G 3/20 180/65.51 |
| 2009/0236158 A1* | 9/2009 | Sakuma | ............... | B60K 7/0007 180/65.51 |
| 2015/0158381 A1* | 6/2015 | Shin | .................... | B60K 17/046 475/149 |
| 2016/0052359 A1* | 2/2016 | Matayoshi | ........... | B60K 7/0007 180/65.51 |

FOREIGN PATENT DOCUMENTS

| | | |
|---|---|---|
| JP | 2006-240430 | 9/2006 |
| JP | 2012-183981 | 9/2012 |
| JP | 2013-063727 | 4/2013 |

\* cited by examiner

COUPLING STRUCTURE OF IN-WHEEL MOTOR DRIVE DEVICE AND STRUT TYPE SUSPENSION DEVICE

TECHNICAL FIELD

The present invention relates to inner and outer structures of an in-wheel motor drive device.

BACKGROUND ART

An in-wheel motor is arranged inside a wheel, and hence is advantageous in that there is no need to mount the in-wheel motor on a vehicle body for a car like an engine (internal combustion engine), thereby leaving a large inner space of the vehicle body. As a suspension device having an in-wheel motor attached on the lower side of a vehicle body, for example, those disclosed in Japanese Unexamined Patent Application Publications No. 2004-090822 (Patent Literature 1) and No. 2006-240430 (Patent Literature 2) are conventionally known. Patent Literature 1 discloses that an in-wheel motor is suspended on a double wishbone type suspension device or a strut type suspension device. Patent Literature 2 discloses that an in-wheel motor is suspended on a strut type suspension device.

CITATION LIST

Patent Literatures

PLT 1: Japanese Unexamined Patent Application Publication No. 2004-090822
PLT 2: Japanese Unexamined Patent Application Publication No. 2006-240430

SUMMARY OF INVENTION

Technical Problem

The double wishbone type suspension device has a complicated structure with many components, and hence is more expensive. In contrast, the strut type suspension device has a simple structure with relatively few components, and hence is less expensive. Further, as for an electric motor vehicle, there exists a need for attaching an in-wheel motor to a vehicle body at low cost using the strut type suspension device.

The attached portion between the strut and the in-wheel motor is not mentioned in Patent Literature 1. Accordingly, the in-wheel motor cannot be coupled to the strut type suspension device in practice.

In the in-wheel motor disclosed in Patent Literature 2, the motor is arranged coaxially with the axle, the lower portion of the strut is fastened with a clamping band, and the clamping band is fixed to an arm portion that extends upward from the motor. The strut is then arranged inward in the vehicle width direction from the motor. This arranges a strut, a motor, a wheel hub, and an in-wheel sequentially along the axle, so that the distance from the strut to the in-wheel becomes large. Then, in the case where the in-wheel motor is attached to the vehicle body for an internal combustion engine car through the strut type suspension device, the wheel is adversely protruded from the vehicle body in the vehicle width direction.

In view of the above circumstances, an object of the present invention is to provide a coupling structure of an in-wheel motor and a strut type suspension device, which is improved over the conventional ones.

Solution to Problem

In order to achieve the above object, the coupling structure of the in-wheel motor drive device and the strut type suspension device according to the present invention includes an in-wheel motor drive device having a wheel-hub bearing portion rotatably supporting a wheel hub, a motor portion that is provided offset from an axis of the wheel-hub bearing portion and drives the wheel hub, and a speed reduction portion that reduces a rotational speed of the motor portion to transmit the reduced rotational speed to the wheel hub; and a strut type suspension device having a retractable strut that connects to the in-wheel motor drive device so as not to relatively move and a swingable lower arm that is coupled to the in-wheel motor drive device in any direction, permitting vertical swinging of the in-wheel motor drive device and also permitting steering of the in-wheel motor drive device about a steering shaft that passes through a coupling point between the lower arm and the in-wheel motor drive device, in which an axis of the motor portion is arranged above the coupling point of the lower arm.

According to the present invention, the motor portion is arranged offset from the wheel-hub bearing portion. This allows the axial size of the in-wheel motor drive device to be made smaller than that in the case where the motor portion is arranged coaxially. Also, the vehicle body and the strut type suspension device for conventional internal combustion engine cars can be used, which is advantageous in cost. Preferably, the axis of the motor portion may be arranged above the height of the axis of the wheel-hub bearing portion. The "axis of the motor portion may be arranged above the height of the axis of the wheel-hub bearing portion" includes the case where the entire motor portion is arranged above the height of the axis of the wheel-hub bearing portion, and the case where most of the motor portion is arranged above the height of the axis of the wheel-hub bearing portion and also a part of the motor portion is arranged below the height of the axis thereof. The motor portion may be arranged directly above or obliquely above the axis of the wheel-hub bearing portion.

As one embodiment of the present invention, the axis of the motor portion is arranged on a vehicle front side from a vehicle longitudinal position of the axis of the wheel-hub bearing portion. According to this embodiment, when an electric motor vehicle including the present invention turns and travels, a clearance between the motor portion that is provided on the turning outer wheel and displaced inward in the vehicle width direction, and a wheel housing of a vehicle body positioned inward in the vehicle width direction from the motor portion can be secured. As another embodiment, the axis of the motor portion may be arranged on the vehicle front side from the vehicle longitudinal position of the axis of the wheel-hub bearing portion. The "axis of the motor portion is arranged on the vehicle front side from the vehicle longitudinal position of the axis of the wheel-hub bearing portion" includes the case where the entire motor portion is arranged on the vehicle front side from the longitudinal position of the axis of the wheel-hub bearing portion and the case where most of the motor portion is arranged on the vehicle front side from the longitudinal position of the axis of the wheel-hub bearing portion and a part of the motor portion is arranged on the vehicle rear side from the longitudinal position of the axis of the wheel-hub bearing portion.

As a preferred embodiment of the present invention, the motor portion is arranged on a vehicle front side from the strut. Preferably, the entire motor portion including a motor casing may be arranged on the vehicle front side from the strut. Alternatively, the vehicle longitudinal position in the rear of the motor portion may be overlapped with the vehicle longitudinal position of the strut.

As a further preferred embodiment of the present invention, the speed reduction portion is a parallel three-shaft type speed reducer having an input shaft that extends along the axis of the motor portion; an output shaft that extends along the axis of the wheel-hub bearing portion; and an intermediate shaft that extends in parallel to the input shaft and the output shaft, and among the shafts, the intermediate shaft is arranged on a vehicle front side from the strut. According to this embodiment, the motor portion and the speed reduction portion adjacent to the motor portion can be arranged on the front side from the axis of the wheel-hub bearing portion. Preferably, the entire gear having the largest diameter that is connected coaxially to the intermediate shaft may be arranged on the vehicle front side from the strut. Alternatively, the vehicle longitudinal position in the rear of the gear having the largest diameter may be overlapped with the vehicle longitudinal position of the strut. As another embodiment, the intermediate shaft of the speed reduction portion may be arranged on the vehicle rear side from the strut.

As one embodiment of the present invention, the motor portion and/or the speed reduction portion is/are arranged in a circle having a diameter equal to a rim inner diameter of an in-wheel that connects to the wheel hub. According to this embodiment, the in-wheel motor drive device can be accommodated in a hollow region of the in-wheel. As another embodiment, a part of or all the motor portion, or a part of the speed reduction portion may be protruded from the circle toward the outer diameter side. The motor portion and/or the speed reduction portion may be protruded from the hollow region of the in-wheel toward the axial direction.

As one embodiment of the present invention, the in-wheel motor drive device further has a carrier of which a central portion connects to a non-rotating member of the wheel-hub bearing portion, an upper end portion connects to the strut, and a lower end portion is coupled to the lower arm in any direction. According to this embodiment, the carrier can take charge of all wheel loads and steering forces that act on the wheel hub. As a preferred embodiment, the carrier is formed of one member instead of combination of a plurality of components.

As a preferred embodiment of the present invention, the carrier has a coupling portion for coupling to a steering device. According to this embodiment, the carrier can take charge of all the steering forces that act on the wheel hub. As a preferred embodiment, the carrier is one member that is integrally connected to the coupling portion for the steering device.

As one embodiment of the present invention, the motor portion is arranged in a position overlapped with the strut with respect to an axial position of the wheel-hub bearing portion. According to this embodiment, the outer peripheral surface of the motor portion is arranged in a position overlapped with the strut at the axial position of the axle. This allows the axial size of the in-wheel motor drive device to be made smaller.

As one embodiment of the present invention, the coupling portion of a steering tie-rod of the steering device and the in-wheel motor drive device is arranged in a region on the vehicle rear and/or lower side from the axis of the wheel-hub bearing portion, of an inner-diameter side space defined by the rim inner diameter of the in-wheel that connects to the wheel hub. According to this embodiment, the coupling portion of the steering tie-rod and the in-wheel motor drive device is arranged radially inward from a rim inner diameter surface of the in-wheel and in a space except a region on the vehicle front and upper side from the axle.

As one embodiment of the present invention, the speed reduction portion includes a plurality of gears, and all the gears of the speed reduction portion are arranged in a position overlapped with the wheel hub with respect to an axial position of the wheel-hub bearing portion. According to this embodiment, all the gears of the speed reduction portion are arranged in a position overlapped with the wheel hub in the axial direction of the axle. This allows the axial size of the in-wheel motor drive device to be made smaller.

As one embodiment of the present invention, the entire motor portion is arranged offset from the axis of the wheel-hub bearing portion. According to this embodiment, a region radially inward from the outer peripheral surface of the casing of the motor portion and the axle do not cross each other.

Advantageous Effects of Invention

Accordingly, the present invention allows an in-wheel motor to be attached to a conventional vehicle body for an internal combustion engine car through a strut type suspension device, which is advantageous in cost.

DESCRIPTION OF EMBODIMENTS

Figure 1:
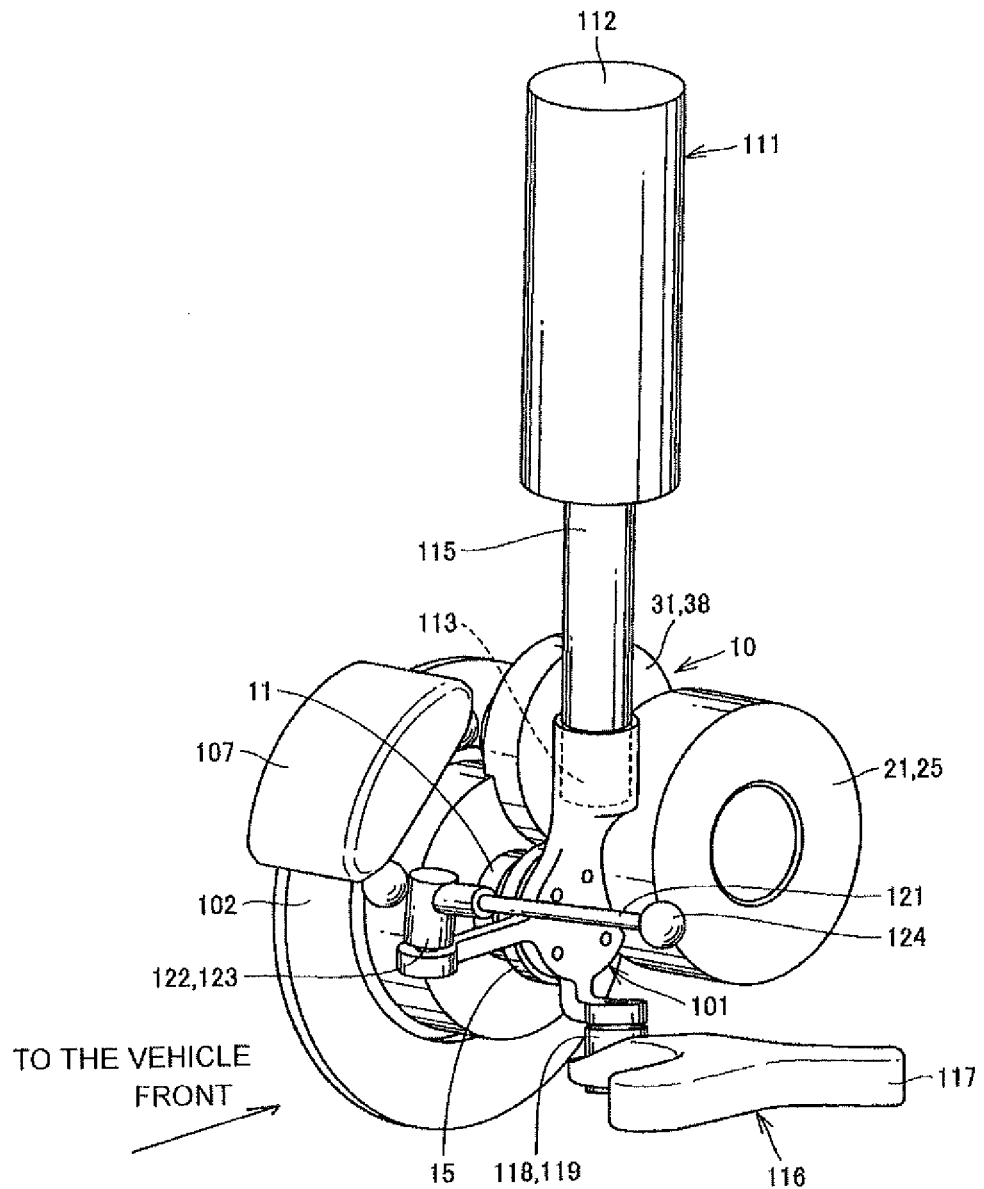
FIG. 1 is a perspective view showing an embodiment of the present invention.
Figure 2:
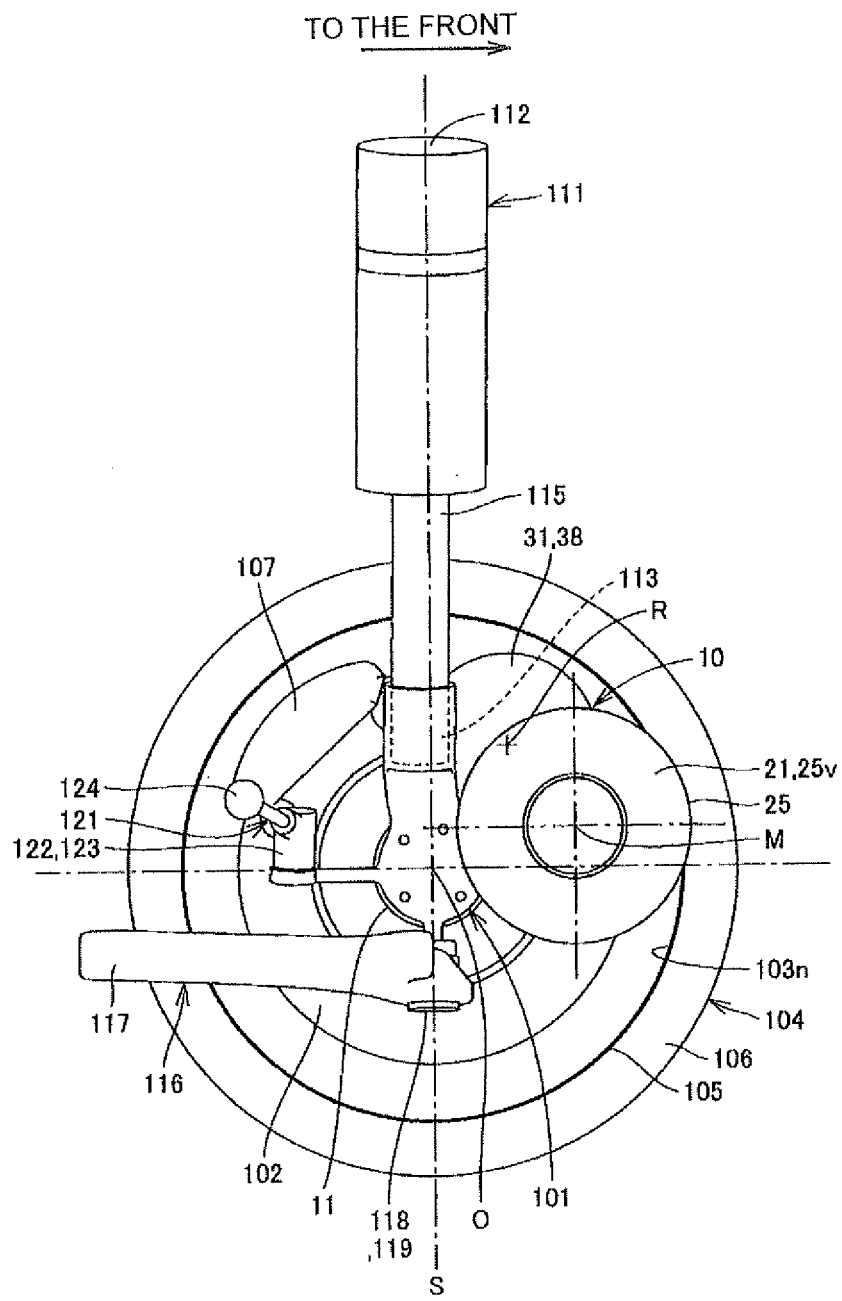
FIG. 2 is a side view showing the embodiment of the present invention.
Figure 3:
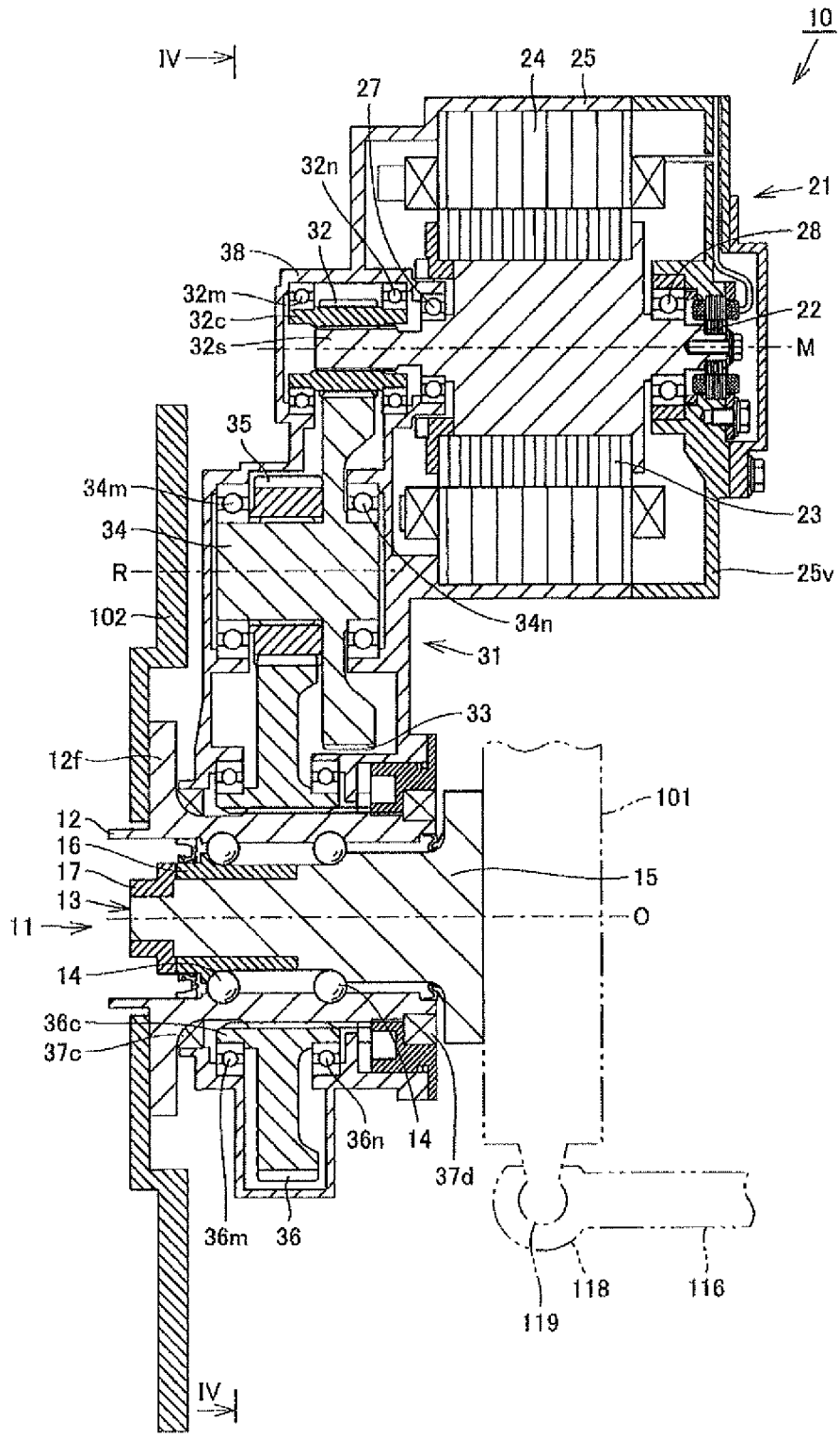
FIG. 3 is a longitudinal sectional view showing an in-wheel motor drive device according to the embodiment of the present invention.
Figure 4:
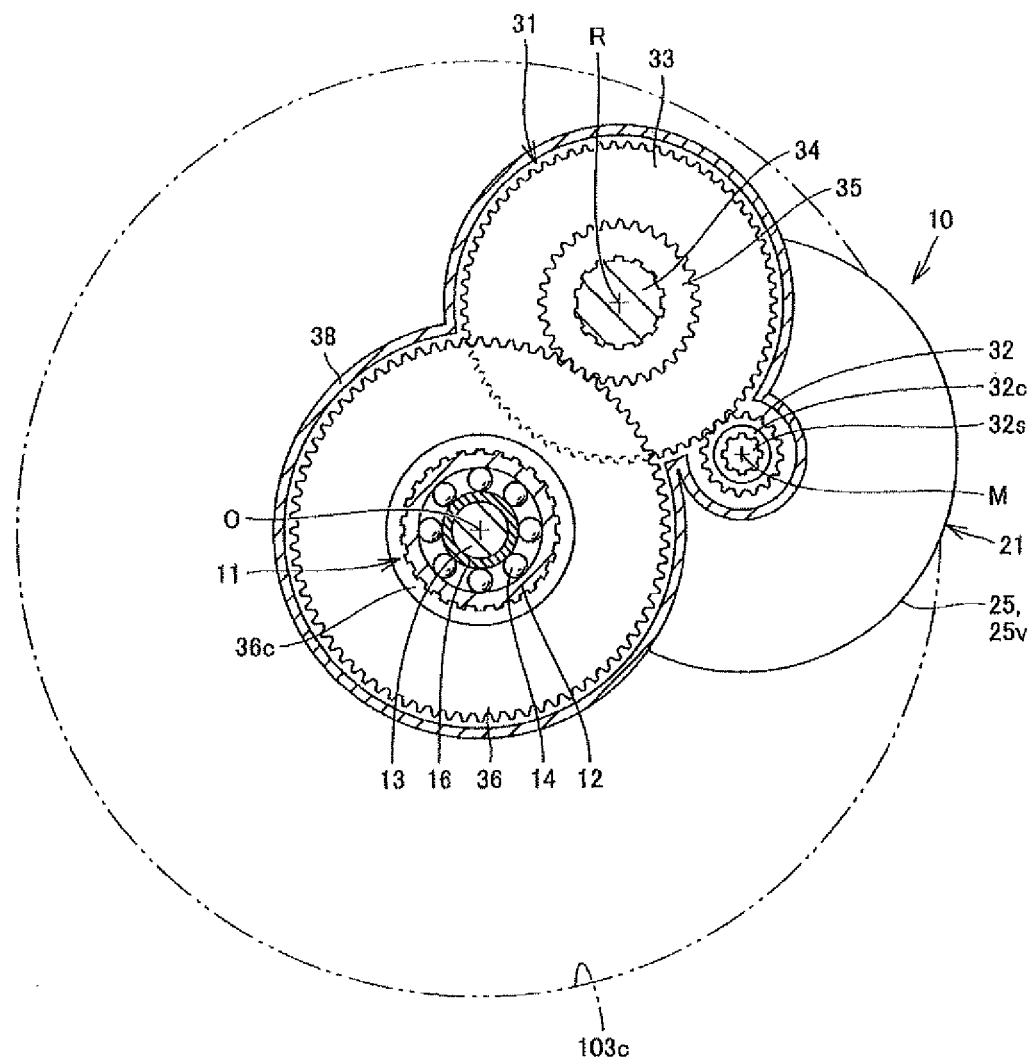
FIG. 4 is a cross-sectional view showing the in-wheel motor drive device according to the embodiment of the present invention.

An embodiment of the present invention will be described in detail below with reference to the accompanying drawings. FIG. 1 is a perspective view showing an embodiment of the present invention and shows a left front wheel of a vehicle. FIG. 2 is a side view showing the embodiment of the present invention, and shows a state as viewed from the inside in the vehicle width direction. FIG. 3 is a longitudinal sectional view showing an in-wheel motor drive device according to the embodiment of the present invention. FIG. 4 is a cross-sectional view showing the in-wheel motor drive device according to the embodiment of the present invention.

In this embodiment, a pair of right and left front wheels and/or a pair of right and left rear wheels of an electric motor vehicle are driven by in-wheel motor drive devices 10. Each of the in-wheel motor drive devices 10 is attached to a vehicle body of the electric motor vehicle through a strut type suspension device. The strut type suspension device has a strut 111 that extends in a vertical direction and a lower arm 116 that extends in a vehicle width direction.

The strut 111 is a shock absorber in which a damper and a spring are combined and is retractable in the vertical direction. The range in which the strut 111 and the suspension device extend and retract also refers to a suspension stroke amount. The upper end 112 of the strut 111 is pivotably attached to the vehicle body, not shown. The lower end 113 of the strut 111 is attached and fixed to the upper portion of a carrier 101 so as not to relatively move. The lower end 113 of the strut 111 is rigidly connected to the carrier 101. This avoids the in-wheel motor drive device 10 from pivoting and changing its angle relative to a rod 115 that occupies the lower end region of the strut 111.

The lower arm 116 is swingable in the vertical direction, using a vehicle-widthwise inner end 117 as a base end and a vehicle-widthwise outer end 118 as a distal end. The vehicle-widthwise inner end 117 is coupled to the vehicle body (not shown) through a pivot shaft (not shown) that extends in the vehicle longitudinal direction. The vehicle-widthwise outer end 118 of the lower arm 116 incorporates a ball joint (shown in FIG. 3 and designated as 119) and is coupled to the lower portion of the in-wheel motor drive device 10 in any direction through the ball joint 119. Referring to FIG. 2, a straight line that connects the vehicle-widthwise outer end 118 of the lower arm 116 with the upper end 112 of the strut 111 forms a steering shaft S. The phrase "in any direction" refers to reorienting in all directions on a spherical surface.

As shown in FIG. 2, the in-wheel motor drive device 10 of this embodiment is arranged in a wheel 104. The wheel 104 is a known wheel having an in-wheel 105 and a tire 106 that is fitted to the outer periphery of the in-wheel 105. The wheel 104 is connected coaxially to the wheel-hub bearing portion 11 and has an axis O that is common thereto.

The in-wheel motor drive device 10 includes a wheel-hub bearing portion 11 that connects to the in-wheel 105 by a coupling tool such as a bolt; a motor portion 21 that drives the wheel 104; and a speed reduction portion 31 that reduces rotation speed of the motor portion 21 and transmits the reduced rotation speed to the wheel-hub bearing portion 11. An axis M of the motor portion 21 is offset from the axis O of the wheel-hub bearing portion 11 and arranged in parallel thereto. The speed reduction portion 31 is a three parallel shaft-type gear reducer provided across the axes O, M, and R shown in FIG. 2, and incorporates an input shaft, an intermediate shaft (also referred to as countershaft), and an output shaft. An axis R of the intermediate shaft is offset from the axis O of the wheel-hub bearing portion 11 and arranged in parallel thereto. The inner structure of the in-wheel motor drive device 10 will be described in detail later.

The axes O, M, and R extend in the vehicle width direction. A positional relationship of the wheel-hub bearing portion 11, the motor portion 21, and the speed reduction portion 31 as viewed in the vehicle width direction is as shown in FIG. 2, and the axis M of the motor portion 21 is arranged above the height of the axis O of the wheel-hub bearing portion 11. The axis M of the motor portion 21 is arranged above the height of a coupling point (a center of the ball joint 119) between the carrier 101 and the lower arm 116. Although the lower portion of the motor portion 21 is lower than the height of the axis O of the wheel-hub bearing portion 11, the motor portion 21 may be entirely arranged above the axis O. The axis R of the intermediate shaft 34 of the speed reduction portion 31 is arranged above the height of the axis M of the motor portion 21. The height of the lower portion of the motor portion 21 overlaps with the height of the vehicle-widthwise outer end 118 of the lower arm 116. However, the vehicle-widthwise outer end 118 is arranged below the motor portion 21.

The axis M of the motor portion 21 is arranged on the vehicle front side from the vehicle longitudinal position of the axis O of the wheel-hub bearing portion 11. The axis R of the intermediate shaft 34 in the speed reduction portion 31 is arranged between the axis O of the wheel-hub bearing portion 11 and the axis M of the motor portion 21 in the vehicle longitudinal direction.

As shown in FIG. 1, the motor portion 21 protrudes inward in the vehicle width direction from the wheel-hub bearing portion 11 and the speed reduction portion 31. A motor casing 25 that forms an outer shell of the motor portion 21 has a cylindrical shape. The lower end 113 of the strut 111 is attached and fixed to the in-wheel motor drive device 10 through the carrier 101 to be described later. The carrier 101 is spaced apart from the motor casing 25.

As shown in FIG. 2, the cylindrical side surface of the motor portion 21 is arranged on the vehicle front side so as to be spaced apart from the strut 111. As shown in FIG. 1, the motor portion 21 is arranged in a position overlapped with the strut 111 with respect to the position in the direction of axis O of the wheel-hub bearing portion 11. As shown in FIG. 2, the wheel-hub bearing portion 11 and the speed reduction portion 31 are encompassed by a rim inner diameter surface 103n, and the motor portion 21 protrudes inward in the vehicle width direction from the wheel 104 to avoid interference with the in-wheel 105. A part of the motor portion 21 is positioned on the outer diameter side from a circle having the same diameter as the rim inner diameter surface 103n and is overlapped with the tire 106 as viewed in the vehicle width direction. This portion is, however, positioned on the inner diameter side from a circle having the same diameter as the outer diameter of the wheel 104.

A brake caliper 107 is attached and fixed to a body casing 38. The brake caliper 107 brakes the wheel 104 by sandwiching a brake rotor 102. As shown in FIG. 2, the brake caliper 107 is arranged above the height of the axis O of the wheel-hub bearing portion 11. The brake caliper 107 is arranged on the vehicle rear side from the axis O. The brake caliper 107, the brake rotor 102, the wheel-hub bearing portion 11, and the speed reduction portion 31 are accommodated in a hollow region of the in-wheel 105.

The carrier 101 of the in-wheel motor drive device 10 is coupled in any direction to a vehicle-widthwise outer end 122 of a tie rod 121 that extends in the vehicle width direction through a ball joint 123. The ball joint 123 is incorporated in the vehicle-widthwise outer end 122. A vehicle-widthwise inner end 124 of the tie rod 121 is coupled in any direction to a steering device, not shown. The tie rod 121 is pushed or pulled in the vehicle width direction by the steering device, and whereby the in-wheel motor drive device 10, the wheel 104, and the strut 111 are steered about the steering shaft S.

The most significant load is applied to the lower arm 116 as a member that transmits input loads in the vehicle longitudinal direction and on the right and left in the vehicle width direction generated in the wheel 104, to a vehicle body, so that the lower arm 116 has a large cross section.

Further, to avoid bump steer, the tie rod 121 has a length equal to the lower arm 116 and is arranged near the lower arm 116. A motor rotation shaft 22 of the motor portion 21 that is arranged offset from the axis O of the wheel may therefore be arranged above the coupling point (ball joint 119) between the carrier 101 and the lower arm 116. This avoids interference with the strut 111, and whereby while the existing suspension stroke amount is maintained, a distance from the motor portion 21 to the lower arm 116 or a distance from the motor portion 21 to the tie rod 121 can be secured, and a curved amount of the lower arm 116 to avoid such interference can be lowered, thereby allowing a reduction of the ground clearance of the suspension device to be minimized.

The vehicle-widthwise outer end 122 of the tie rod 121 and the ball joint 123 are arranged on the vehicle rear side from the axis O. According to this embodiment, as shown in FIG. 2, the ball joint 123 that is the coupling portion between the tie rod 121 and the in-wheel motor drive device 10 is arranged in a region on the vehicle rear side from the axis O, of a circular inner-diameter side space defined by the rim inner diameter surface 103n of the in-wheel 105. Alternatively, as a modification not shown, the ball joint 123 may be arranged in a region below the axis O of the inner-diameter side space of the rim inner diameter surface 103n.

As shown in FIG. 2, the strut 111 is arranged directly above the axis O. This arranges the motor portion 21 on the vehicle front side from the strut 111. In contrast, the brake caliper 107 and the tie rod 121 are arranged on the vehicle rear side from the strut 111.

The action of this embodiment will be described below.

Figure 5:
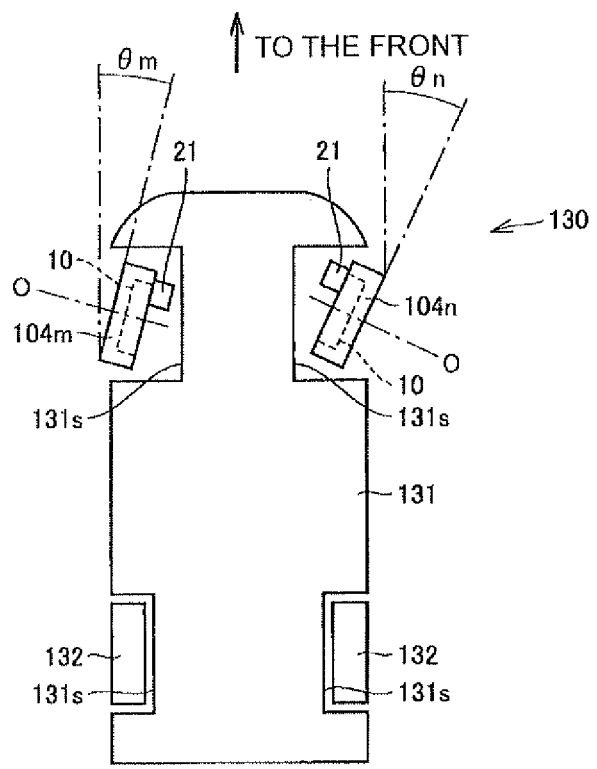
FIG. 5 is a schematic view showing that a vehicle including the embodiment of the present invention turns and travels.

FIG. 5 is a schematic view showing that a vehicle including the embodiment of the present invention turns and travels. An electric motor vehicle 130 has a vehicle body 131; wheels 104 that are a pair of right and left front wheels; and a pair of right and left rear wheels 132. To distinguish between right and left, the wheels 104 that are a pair of right and left front wheels are designated with the suffixes m and n for convenience.

The wheel 104 and the in-wheel motor drive device 10 are accommodated in a wheel housing 131s that is provided on both sides of the vehicle body 131 in the vehicle width direction. In the case where the electric motor vehicle 130 travels in a straight line, sufficient clearance in the vehicle width direction is kept between the wheel 104 and the in-wheel motor drive device 10, and the wheel housing 131s. The motor portion 21 of the in-wheel motor drive device 10 is arranged on the vehicle front side from the axis O of each wheel 104 and protrudes inward in the vehicle width direction. The motor portions 21 drive outer wheels 12.

In the case where the electric motor vehicle 130 turns and travels, a clearance between the motor portion 21 and the vehicle body 131 (wheel housing 131s) reduces at a turning outer wheel 104m.

A steering angle θm of the turning outer wheel 104m and a steering angle θn of a turning inner wheel 104n satisfy a relationship of θm<θn according to Ackerman's characteristics. This allows the clearance between the motor portion 21 and the vehicle body 131 (wheel housing 131s) to be kept by arranging the motor portion 21 on the vehicle front side from the axis O. According to this embodiment, when the electric motor vehicle 130 including the present invention turns and travels, a clearance between the motor portion 21 that is provided on the turning outer wheel 104m and displaced inward in the vehicle width direction, and the wheel housing 131s of the vehicle body 131 positioned inward in the vehicle width direction from the motor portion 21 can be kept.

Figure 6:
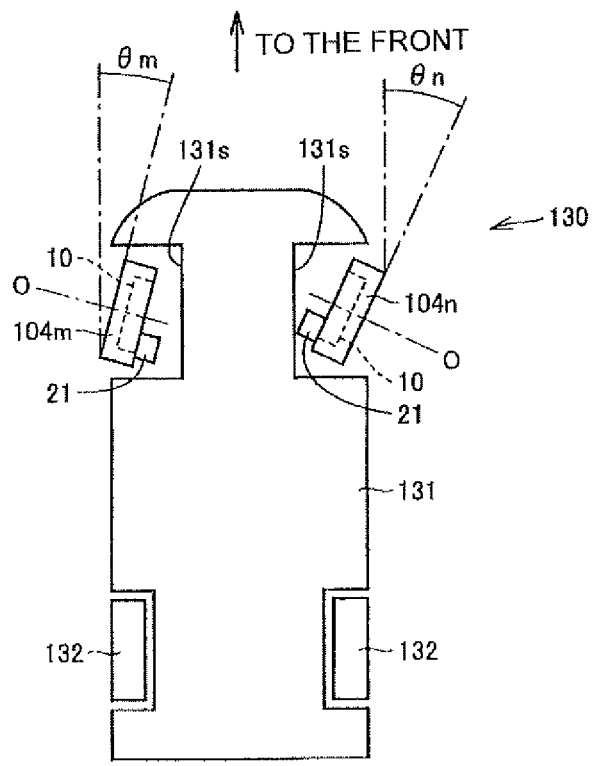
FIG. 6 is a schematic view showing that a vehicle of the reference example turns and travels.

For easy understanding of the present invention, FIG. 6 shows that a vehicle of the reference example turns and travels. In the reference example, the motor portion 21 is relocated on the vehicle rear side from the axis O. This does not allow a clearance between the motor portion 21 of the turning inner wheel 104n and the vehicle body 131 to be kept. That is, when the turning outer wheel 104m (FIG. 5) of this embodiment and the turning inner wheel 104n (FIG. 6) of the reference example are compared, the superiority of this embodiment may be understood.

According to this embodiment that conveniently uses Ackerman's characteristics, even though the motor portion 21 is arranged so as to be protruded inward in the vehicle width direction from the wheel 104, the clearance between the motor portion 21 and the vehicle body 131 can be kept when the vehicle turns and travels as shown in FIG. 5. As shown in FIG. 5, the clearance between the motor portion 21 of the turning inner wheel 104n and the vehicle body 131 is sufficient, which poses no problem.

As a modification not shown, to keep a caster trail, the strut 111 may be arranged in a tilted posture with its upper end 112 being on the vehicle rear side and its lower end 113, on the vehicle front side. In such a case, a circumferential region of 180° above and about the axis O is broader than a circumferential region of 90° on the vehicle front side from the strut 111 and the steering shaft S, and is narrower than a circumferential region of 90° on the vehicle rear side from the strut 111 and the steering shaft S. Therefore, the motor portion 21 may be arranged on the vehicle front side from the axis O.

Referring to FIGS. 3 and 4, the in-wheel motor drive device will be described in detail below.

The in-wheel motor drive device 10 includes a wheel-hub bearing portion 11 that is provided at the center of the wheel, not shown; a motor portion 21 that drives a wheel; and a speed reduction portion 31 that reduces rotation speed of the motor portion 21 and transmits the reduced rotation speed to the wheel-hub bearing portion 11. The motor portion 21 and the speed reduction portion 31 are arranged offset from the axis O of the wheel-hub bearing portion 11.

The wheel-hub bearing portion 11 has an outer wheel 12 that connects to an in-wheel, not shown, as a wheel hub; an inner fixing member 13 that is arranged in a central bore of the outer wheel 12; and a plurality of rolling bodies 14 that are arranged in an annular gap between the outer wheel 12 and the inner fixing member 13. The inner fixing member 13 includes a nonrotatable fixed shaft 15, an inner race 16, and a retaining nut 17. The fixed shaft 15 extends along the direction of axis O, having its one end in the direction of axis O formed to have a small diameter and the other end formed to have a large diameter. The other end of the fixed shaft 15 in the direction of axis O is attached to a carrier 101 while being oriented inward in the vehicle width direction. The carrier 101 also refers to a hub carrier because it connects to the wheel-hub bearing portion 11. One end of the fixed shaft 15 in the direction of axis O is oriented outward in the vehicle width direction and the annular inner race 16 is fitted to its outer periphery. Further, the retaining nut 17 is screwed in one end of the fixed shaft 15 in the direction of axis O to retain the inner race 16. The carrier 101 is interposed between a nonrotatable member of the wheel-hub bearing portion 11 and a suspension device, and takes charge of all the wheel loads of the in-wheel motor drive device 10.

Rolling bodies 14 are arranged in double rows so as to be spaced in the direction of axis O. The outer diameter surface of the inner race 16 forms an inner track surface of the rolling bodies 14 in the first row, facing to an inner diameter surface on one side of the outer wheel 12 in the direction of axis O. In contrast, the outer periphery of the middle portion of the fixed shaft 15 in the direction of axis O forms an inner track surface of the rolling bodies 14 in the second row, facing to an inner diameter surface on the other side of the outer wheel 12 in the direction of axis O.

A flange 12*f* is formed at one end of the outer wheel 12 in the direction of axis O. The flange 12*f* forms a connecting portion for connecting coaxially to a brake rotor 102 and a wheel, now shown. The outer wheel 12 is connected to the wheel by the flange 12*f* and a bolt, not shown, to rotate integrally with the wheel.

The motor portion 21 has a motor rotation shaft 22; a rotor 23; a stator 24; and a motor casing 25, as shown in FIG. 3, and is sequentially arranged from an axis M of the motor portion 21 to the outer diameter side in this order. The motor portion 21 is a radial gap motor of an inner rotor and outer stator type, or may be another type of motor. For example, though not shown, the motor portion 21 may be an axial gap motor.

The motor rotation shaft 22 and the axis M that serves as a rotation center of the rotor 23 extend in parallel to the axis O of the wheel-hub bearing portion 11. That is, the motor portion 21 is arranged offset away from the axis O of the wheel-hub bearing portion 11. The axial position of the motor portion 21 overlaps with the inner fixing member 13 of the wheel-hub bearing portion 11 as shown in FIG. 3. This allows the axial size of the in-wheel motor drive device 10 to be made smaller. Both ends of the motor rotation shaft 22 are rotatably supported by the motor casing 25 through rolling bearings 27, 28. The motor casing 25 has a substantially cylindrical shape, with its one end in the direction of axis M being integrally connected to a body casing 38 and its other end in the direction of axis M being sealed to a cover 25v having a circular shape.

In this embodiment, as shown in FIG. 2, all the outer peripheral surfaces of the motor portion 21 are arranged offset from the axis O in a direction perpendicular to the axis. A space on the inner-diameter side from the outer peripheral surface of the motor portion 21, specifically, an inner space of the motor casing 25, does not cross the axis O.

Turning the description back to FIG. 3, the speed reduction portion 31 has an output gear 36 that is provided coaxially with the outer peripheral surface of the outer wheel 12; an input gear 32 that connects to the motor rotation shaft 22 of the motor portion 21; a plurality of intermediate gears 33, 35 that transmit rotation from the input gear 32 to the output gear 36; and a body casing 38 that houses these gears.

The input gear 32 is an external-tooth gear having a small diameter, and has many teeth formed on the outer periphery of the axial middle portion of a cylindrical portion 32*c* that is arranged along the axis M. The inner periphery of the cylindrical portion 32*c* is fitted to the outer periphery of a shaft portion 32*s* so as not to be relatively rotatable, the shaft portion 32*s* further extending toward one axial side from the motor rotation shaft 22. Both ends of the cylindrical portion 32*c* are rotatably supported by the body casing 38 through the rolling bearings 32*m*, 32*n*. The body casing 38 covers the speed reduction portion 31 and the wheel-hub bearing portion 11 so as to surround the axes O, M, and R extending in parallel to one another, and also covers both axial sides of the speed reduction portion 31. The cylindrical portion 32*c* and the shaft portion 32*s* form an input shaft of the speed reduction portion 31. One axial end surface of the body casing 38 faces the brake rotor 102. The other axial end surface of the body casing 38 connects to the motor casing 25. The motor casing 25 is attached to the body casing 38 and protrudes toward the other axial side from the body casing 38. The body casing 38 houses all the rotation elements (shafts and gears) of the speed reduction portion 31.

As shown in FIG. 1, the motor casing 25 has its one axial end connected to the body casing 38 that connects to the carrier 101. Alternatively, as a modification not shown, the motor casing 25 has a part of its outer periphery connected to the carrier 101. Thus, the motor casing 25 and the body casing 38 are supported by the carrier 101. As shown in FIGS. 1 and 2, the carrier 101 is longer in the vertical direction, the upper end of the carrier 101 connects to a lower end 113 of a strut 111 so as not to relatively move, and the lower end of the carrier 101 is coupled to a vehicle-widthwise outer end 118 of a lower arm 116 in any direction. The central portion of the carrier 101 connects to the fixed shaft 15 that is a nonrotatable member of the wheel-hub bearing portion 11.

The carrier 101 has an arm portion 101*r* that extends in the vehicle longitudinal direction. Although the arm portion 101*r* of this embodiment protrudes toward the vehicle front side from the connecting portion between the fixed shaft 15 and the carrier 101, the arm portion may protrude toward the vehicle rear side as a modification not shown. A coupling portion for coupling to the steering device is provided at the tip end of the arm portion 101*r*. The tip end of the arm portion 101*r* couples in any direction to a vehicle-widthwise outer end 122 of a tie rod 121 through a ball joint 123. Accordingly, the carrier 101 extends in three directions from the wheel-hub bearing portion 11, and end portions of the carrier 101 are respectively coupled to the strut 111 that is an upper suspension member, the lower arm 116 that is a lower suspension member, and the tie rod 121 that extends from a steering device. The carrier 101, therefore, transmits all the wheel loads and steering forces to the in-wheel motor drive device 10.

Turning the description back to FIG. 3, the input gear 32 having a small diameter is engaged with a first intermediate gear 33 that is an external-tooth gear having a large diameter. The first intermediate gear 33 is connected coaxially to a second intermediate gear 35 that is an external-tooth gear having a small diameter, by the intermediate shaft 34. Both ends of the intermediate shaft 34 are rotatably supported by the body casing 38 through rolling bearings 34*m*, 34*n*. The first intermediate gear 33 and the second intermediate gear 35 are arranged between the rolling bearings 34*m* and 34*n*, and are adjoined each other. According to this embodiment, the first intermediate gear 33 and the intermediate shaft 34 are integrally formed and the second intermediate gear 35 is fitted to the outer periphery of the intermediate shaft 34 so as not to be relatively rotatable. An axis R through the center of the intermediate shaft 34 extends in parallel to the axis O of the wheel-hub bearing portion 11. This allows the speed reduction portion 31 to be arranged offset from the wheel-hub bearing portion 11. The second intermediate gear 35 having a small diameter is engaged with the output gear 36 having a large diameter. The position relationship of the axes O, R, and M is as shown in FIG. 4.

The output gear 36 is an external-tooth gear and the outer wheel 12 is fitted to a central bore of the output gear 36 so as not to be relatively rotatable. Such fitting is spline fitting or serration fitting. The tips and bottoms of the teeth of the output gear 36 have larger diameters than the outer peripheral surface of the outer wheel 12. When viewed in the direction of axis O, the outer peripheral portion of the output gear 36 and the outer peripheral portion of the first intermediate gear 33 are overlapped with each other. A cylindrical portion 36c is formed at the center of the output gear 36. Both ends of the cylindrical portion 36c protrude from both end surfaces of the output gear 36 and are rotatably supported by the body casing 38 through the rolling bearings 36m, 36n. The cylindrical portion 36c fitted to the outer wheel 12 forms an output shaft of the speed reduction portion 31.

An opening for allowing the outer wheel 12 to extend through is formed at both axial ends of the body casing 38. Sealing materials 37c, 37d that seal an annular gap with the outer wheel 12 are provided in the openings. This allows the outer wheel 12 that serves as a rotating body to be covered by the body casing 38 except one end thereof in the direction of axis O. In other words, the wheel-hub bearing portion 11 is housed in the body casing 38 except both ends thereof. The body casing 38 is installed across the three axes O, R, and M that are parallel to one another.

As shown in FIG. 4, the first intermediate gear 33, the second intermediate gear 35, and the intermediate shaft 34 are arranged on the outer diameter side from the outer wheel 12. Also, as shown in FIG. 3, the first intermediate gear 33, the second intermediate gear 35, and the intermediate shaft 34 are arranged so as to be overlapped with the position of the outer wheel 12 in the direction of axis O. The same applies to the input gear 32 and the output gear 36, and all the gears in the speed reduction portion 31 are arranged so as to be overlapped with the outer wheel 12 with respect to the position in the direction of axis O. In this embodiment, as shown in FIG. 4, the entire first intermediate gear 33 and the entire second intermediate gear 35 are arranged on the outer diameter side from the outer wheel 12. Alternatively, as a modification not shown, these gears may be arranged such that the first intermediate gear 33 having a large diameter is spaced apart from the second intermediate gear 35 having a small diameter by elongating the intermediate shaft 34 and that the outer peripheral portion of the first intermediate gear 33 is overlapped with the outer peripheral portion of the outer wheel 12 as viewed in the direction of axis O.

Turning the description back to this embodiment, as shown in FIG. 3, the output gear 36 is arranged in an axial region between an axial position at the center of a rolling body 14 arranged in a row closest to one side in the direction of axis O and an axial position at the center of a rolling body 14 arranged in a row closest to the other side in the direction of axis O. This allows the outer wheel 12 to be stably supported by the double-row rolling bodies 14, 14 during driving of the wheels.

As shown in FIG. 4, the motor portion 21 and the speed reduction portion 31 are arranged in a circle 103c having a diameter equal to a rim inner diameter of the in-wheel that connects to the outer wheel 12. Specifically, the output gear 36 is arranged in the circle 103c. This allows the motor portion 21 and the speed reduction portion 31 to be accommodated in the in-wheel.

Additionally, the wheel-hub bearing portion 11, the speed reduction portion 31, and one axial end of the motor portion 21 are accommodated in the hollow region of the in-wheel. In contrast, the other axial end of the motor portion 21 may be accommodated in or protruded from the hollow region of the in-wheel.

The axes R and M are arranged above the axis O. This allows a clearance from the road surface to the motor portion 21 and a clearance from the road surface to the speed reduction portion 31 to be easily kept.

The coupling structure of the in-wheel motor drive device and the strut type suspension device according to another embodiment of the present invention will be described below.

Figure 7:
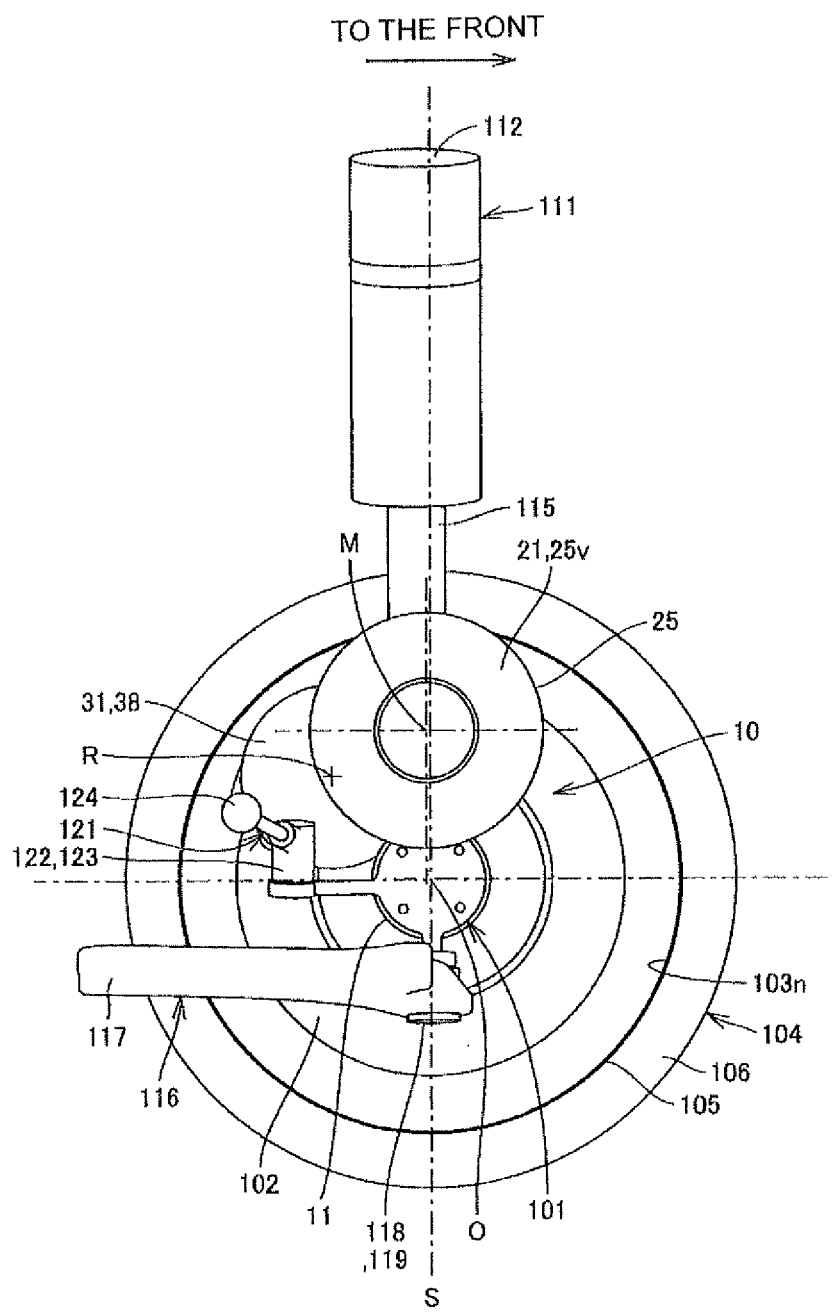
FIG. 7 is a side view showing another embodiment of the present invention.

FIG. 7 is a side view showing another embodiment, and shows a state as viewed from the inside in the vehicle width direction. In another embodiment, the same reference numerals are provided for the structures common to the embodiments described above and their detailed description is omitted. Different structures will be described below. In another embodiment, the vehicle longitudinal position of the motor portion 21 is arranged so as to be overlapped with the strut 111. The motor portion 21 is arranged directly above the axis O of the wheel-hub bearing portion 11. The motor portion 21 is arranged above the wheel-hub bearing portion 11, and the height of the lower portion of the motor portion 21 overlaps with the upper portion of the wheel-hub bearing portion 11 and the lower end 113 of the strut 111. The position in the direction of axis O of the lower end 113 of the strut 111 is thus located on one side in the direction of axis O from the motor portion 21.

The axis R of the speed reduction portion 31 is arranged above the height of the axis O. The axis R of the speed reduction portion 31 is also arranged on the vehicle rear side from the steering shaft S. Though not shown, a brake caliper may be attached and fixed to the body casing 38 in a circumferential region except the vicinity of the axis R of the speed reduction portion 31 in the circumferential direction about the axis O. For example, the brake caliper is arranged on the vehicle front side from the axis O.

The coupling structure of the in-wheel motor drive device and the strut type suspension device according to yet another embodiment of the present invention will be described below.

Figure 8:
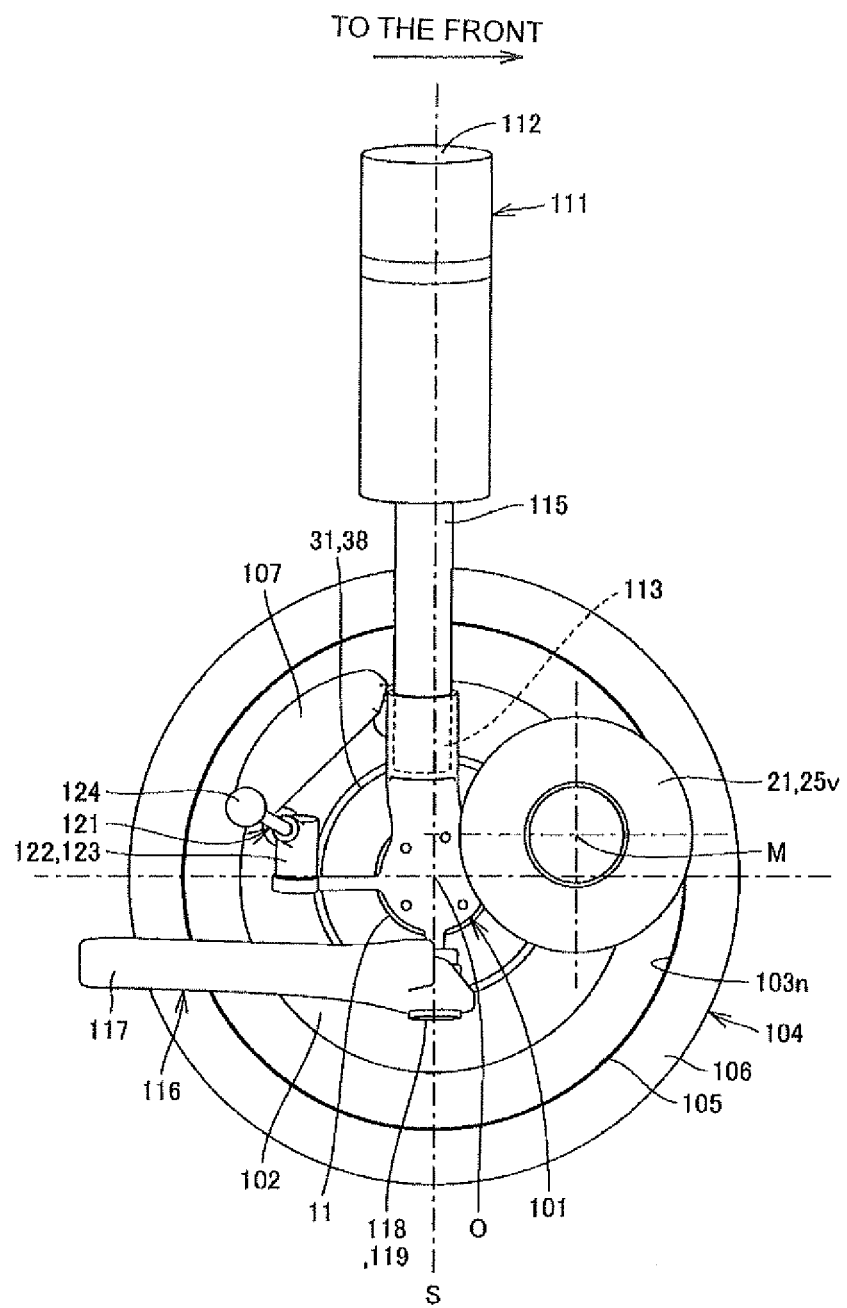
FIG. 8 is a side view showing yet another embodiment of the present invention.

FIG. 8 is a side view showing yet another embodiment, and shows a state as viewed from the inside in the vehicle width direction. In yet another embodiment, the same reference numerals are provided for the structures common to the embodiments described above and their detailed description is omitted. Different structures will be described below. In yet another embodiment, the speed reduction portion 31 is replaced with a parallel two-shaft type speed reducer. The speed reduction portion 31 is provided across the two axes M and O. Another arrangement is the same as the embodiment shown in FIG. 2.

Although the embodiment of the present invention is described above with reference to the drawings, the present invention is not limited to the illustrated embodiment. Various modifications and variations can be made to the illustrated embodiment within a scope that is the same as, or equivalent to that of the present invention.

INDUSTRIAL APPLICABILITY

The coupling structure according to the present invention is advantageously used in electric cars and hybrid vehicles.

REFERENCE SIGNS LIST

10 In-wheel motor drive device
11 Wheel-hub bearing portion
12 Outer wheel
12f Flange 13 Inner fixing member
14 Rolling body
15 Fixed shaft
16 Inner race
21 Motor portion
22 Motor rotation shaft
23 Rotor
24 Stator
25 Motor casing
31 Speed reduction portion
32 Input gear
33 First intermediate gear
34 Intermediate shaft
35 Second intermediate gear
36 Output gear
38 Body casing
101 Carrier
102 Brake rotor
103n Rim inner diameter surface
104 Wheel
104m Turning outer wheel
104n Turning inner wheel
105 In-wheel
106 Tire
107 Brake caliper
111 Strut
112 Upper end
113 Lower end
115 Rod
116 Lower arm
117 Vehicle-widthwise inner end
118 Vehicle-widthwise outer end
119 Ball joint
121 Tie rod
122 Vehicle-widthwise outer end
123 Ball joint
124 Vehicle-widthwise inner end
130 Electric motor vehicle
131 Vehicle body
M, O, R Axis
S Steering shaft

The invention claimed is:

1. A coupling structure of an in-wheel motor drive device and a strut type suspension device, comprising:
an in-wheel motor drive device having a wheel-hub bearing portion rotatable supporting a wheel hub, a motor portion that is provided offset from an axis of the wheel-hub bearing portion and drives the wheel hub, and a speed reduction portion that reduces a rotational speed of the motor portion to transmit the reduced rotational speed to the wheel hub; and
a strut type suspension device having a retractable strut that connects to the in-wheel motor drive device and a swingable lower arm that is coupled to the in-wheel motor drive device in any direction, permitting vertical swinging of the in-wheel motor drive device and also permitting steering of the in-wheel motor drive device about a steering shaft that passes through a coupling point between the lower arm and the in-wheel motor drive device,
wherein an axis of the motor portion is arranged above the coupling point of the lower arm,
wherein the axis of the motor portion is arranged on a vehicle front side from a vehicle longitudinal position of the axis of the wheel-hub bearing portion, and
wherein the speed reduction portion is a parallel three-shaft type speed reducer having an input shaft that extends along the axis of the motor portion; an output shaft that extends along the axis of the wheel-hub bearing portion; and an intermediate shaft that extends in parallel to the input shaft and the output shaft, and the intermediate shaft is arranged on a vehicle front side from the strut.

2. The coupling structure of the in-wheel motor drive device and the strut type suspension device according to claim 1, wherein the motor portion is arranged on a vehicle front side from the strut.

3. The coupling structure of the in-wheel motor drive device and the strut type suspension device according to claim 1, wherein the motor portion and/or the speed reduction portion is/are arranged in a circle having a diameter equal to a rim inner diameter of an in-wheel that connects to the wheel hub.

4. The coupling structure of the in-wheel motor drive device and the strut type suspension device according to claim 1, wherein an outer peripheral surface of the motor portion is arranged in a position overlapped with the strut with respect to an axial position of the wheel-hub bearing portion.

5. The coupling structure of the in-wheel motor drive device and the strut type suspension device according to claim 1, wherein a coupling portion of a steering tie-rod of a steering device and the in-wheel motor drive device is arranged in a region on the vehicle rear and/or lower side from the axis of the wheel-hub bearing portion, of an inner-diameter side space defined by the rim inner diameter of the in-wheel that connects to the wheel hub.

6. The coupling structure of the in-wheel motor drive device and the strut type suspension device according to claim 1, wherein the speed reduction portion includes a plurality of gears, and all the gears are arranged in a position overlapped with the wheel hub with respect to an axial position of the wheel-hub bearing portion.

7. The coupling structure of the in-wheel motor drive device and the strut type suspension device according to claim 1, wherein the entire motor portion is arranged offset from the axis of the wheel-hub bearing portion.

8. A coupling structure of an in-wheel motor drive device and a strut type suspension device, comprising:
an in-wheel motor drive device having a wheel-hub bearing position rotatably supporting a wheel hub, a motor portion that is provided offset from an axis of the wheel-hub bearing portion and drives the wheel hub, and a speed reduction portion that reduces a rotational speed of the motor portion to transmit the reduced rotational speed to the wheel hub; and
a strut type suspension device having a retractable strut that connects to the in-wheel motor drive device and a swingable lower arm that is coupled to the in-wheel motor drive device in any direction, permitting vertical swinging of the in-wheel motor drive device and also permitting steering of the in-wheel motor drive device about a steering shaft that passes through a coupling point between the lower arm and the in-wheel motor drive device,
wherein an axis of the motor portion is arranged above the coupling point of the lower arm, and
wherein the in-wheel motor drive device further comprises a carrier of which a central portion connects to a non-rotating member of the wheel-hub bearing portion, an upper end portion connects to the strut, and a lower end portion is coupled to the lower arm in any direction.

9. The coupling structure of the in-wheel motor drive device and the strut type suspension device according to claim 8, wherein the carrier comprises a coupling portion for coupling to a steering device.

10. The coupling structure of the in-wheel motor drive device and the strut type suspension device according to claim 8, wherein the motor portion and/or the speed reduction portion is/are arranged in a circle having a diameter equal to a rim inner diameter of an in-wheel that connects to the wheel hub.

11. The coupling structure of the in-wheel motor drive device and the strut type suspension device according to claim 8, wherein an outer peripheral surface of the motor portion is arranged in a position overlapped with the strut with respect to an axial position of the wheel-hub bearing portion.

12. The coupling structure of the in-wheel motor drive device and the strut type suspension device according to claim 8, wherein a coupling portion of a steering tie-rod of a steering device and the in-wheel motor drive device is arranged in a region on the vehicle rear and/or lower side from the axis of the wheel-hub bearing portion, of an inner-diameter side space defined by the rim inner diameter of the in-wheel that connects to the wheel hub.

13. The coupling structure of the in-wheel motor drive device and the strut type suspension device according to claim 8, wherein the speed reduction portion includes a plurality of gears, and all the gears are arranged in a position overlapped with the wheel hub with respect to an axial position of the wheel-hub bearing portion.

14. The coupling structure of the in-wheel motor drive device and the strut type suspension device according to claim 8, wherein the entire motor portion is arranged offset from the axis of the wheels-hub bearing portion.

* * * * *